United States Patent [19]

Krause et al.

[11] Patent Number: 5,154,203
[45] Date of Patent: Oct. 13, 1992

[54] PROPORTIONAL MODULATOR FOR AN ELECTROPNEUMATIC BRAKING SYSTEM

[75] Inventors: Jeffrey J. Krause, Olmsted Falls; Paul W. Wozniak, Brookpark; Ronald E. Squires, Grafton, all of Ohio

[73] Assignee: Allied-Signal Inc., Morristown, N.J.

[21] Appl. No.: 599,761

[22] Filed: Oct. 18, 1990

[51] Int. Cl.⁵ .............................................. B60T 15/02
[52] U.S. Cl. ................................ 137/116.3; 137/627.5
[58] Field of Search ................ 137/116.3, 116.5, 627.5

[56] References Cited

U.S. PATENT DOCUMENTS

| | | | |
|---|---|---|---|
| 2,985,490 | 5/1961 | Gates | 137/116.5 X |
| 4,077,674 | 3/1978 | Doto | 137/627.5 X |
| 4,079,753 | 3/1978 | Popp | 137/627.5 |
| 4,565,209 | 1/1986 | Ruchser et al. | 137/116.3 |

FOREIGN PATENT DOCUMENTS 2021185 11/1970 Fed. Rep. of Germany .
2815735 10/1979 Fed. Rep. of Germany .
3240272 5/1984 Fed. Rep. of Germany .

*Primary Examiner*—Robert G. Nilson
*Attorney, Agent, or Firm*—Ken C. Decker; William N. Antonis

[57] ABSTRACT

A proportional modulator includes valve elements actuated by a proportional solenoid that controls communications between an inlet port, an outlet port, and an exhaust port. The pressure level at the outlet port is controlled to vary directly with the current applied to the coil of the solenoid controlling the valve elements.

6 Claims, 1 Drawing Sheet

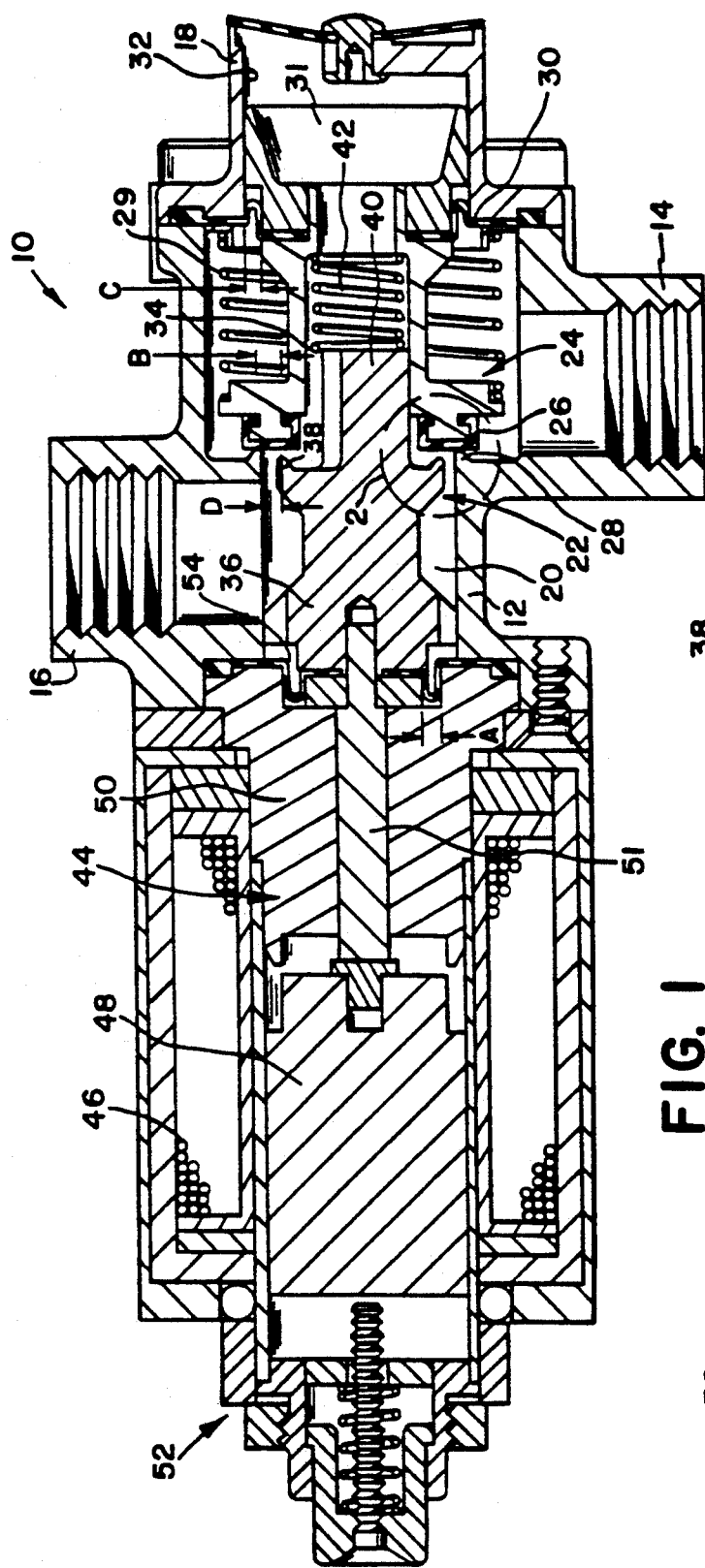
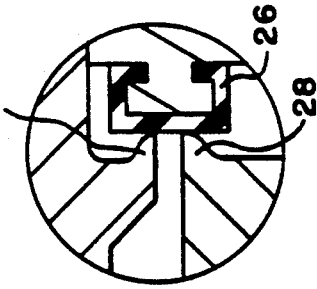
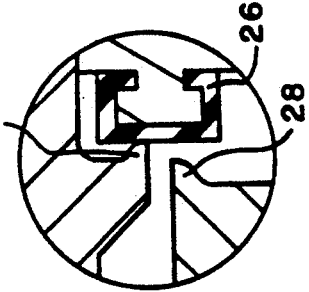
FIG. 1
FIG. 2
FIG. 3

PROPORTIONAL MODULATOR FOR AN ELECTROPNEUMATIC BRAKING SYSTEM

This invention relates to a proportional modulator for controlling the pressure in a fluid pressure braking system.

Modern electronically controlled braking systems, such as anti-lock braking systems, traction control systems, and electropneumatic braking systems, require a fluid pressure modulator that converts an electrical signal from a vehicle electronic control unit into a pneumatic signal to actuate the vehicle foundation brakes. Prior art modulators use two on/off solenoids to control fluid pressure used to actuate the foundation brakes. These modulators are difficult to control because variations in solenoid coils and seal break-away friction must be overcome to communicate fluid pressure to the foundation brakes.

More recently, proportional solenoids have become available. These proportional solenoids generate a force output applied through the armature which is a direct function of the solenoid current and is independent of the distance that the armature travels. The present invention uses a proportional solenoid to establish a delivery pressure that is directly proportional to the current applied to the solenoid. Both the inlet side of the valve and the delivery or output side of the valve are pressure balanced, and seal friction generated by the O-ring seals used in prior art modulators has been eliminated, so that a pressure level at the delivery port is achieved which is a direct function of the solenoid current. The pressure balanced components on the delivery side of the valve provide a feedback force to the solenoid actuator against which the force generated by the solenoid acts. This feedback force is generated by fluid pressure at the delivery port, and is felt by the solenoid armature so that the force generated on the solenoid armature is a function of the feedback force, which is a function of the delivery pressure. Since the force generated by the solenoid is a direct function of the solenoid current, the delivery pressure is also a function of the solenoid current.

These and other advantages of the present invention will become apparent from the following description, with reference to the accompanying drawings, in which:

FIG. 1 is a longitudinal cross-sectional view of a proportional modulator made according to the teachings of the present invention showing the valve elements in the full exhaust or brake released position;

FIG. 2 is a view of the circumscribed area of FIG. 1 but showing the valve elements in the full apply position in which direct communication between the supply or inlet port and the delivery port is provided; and FIG. 3 is a view similar to FIG. 2 of the circumscribed portion of FIG. 1 but illustrating the valve elements in the lapped position in which both the supply and exhaust ports are isolated from the delivery ports.

Referring now to the drawing, a proportional modulator generally indicated by the numeral 10 includes a housing 12 having a supply or inlet port 14, a delivery or outlet port 16, and an exhaust port 18. The exhaust port 18 is communicated to ambient atmosphere. Supply port 14 is communicated to a fluid pressure supply, such as a conventional air pressure storage reservoir. Delivery or outlet port 16 is communicated to the foundation brakes of the vehicle.

Housing 12 defines a chamber 20 therewithin in which valve components generally indicated by the numeral 22 are located. Valve components 22 include an inlet/exhaust valve 24 slidably mounted within the chamber 20 and carrying a valve seating area 26. A spring 29 yieldably urges the inlet/exhaust valve 24 to the left viewing the Figures, so that the valve seating area 26 is yieldably urged into sealing engagement with a circumferentially extending valve seat 28 which circumscribes the chamber 20. A circumferentially extending sealing diaphragm 30 extends between the inlet/exhaust valve 24 in the housing 12 to thereby seal off communication between the chamber 20 and the exhaust port 18. The inlet/exhaust valve 24 includes a guiding portion 31 which slidably engages bore 32 defining exhaust port 18. Valve 24 defines a passage 34 which communicates chamber 20 with the exhaust port 18.

Valve components 22 further include a valve piston 36. Valve piston 36 carries a circumferentially extending valve seat 38 which cooperates with valve seating area 26 to control communication between delivery port 16 and exhaust port 18. The piston 36 includes a portion 40 which is guided in passage 34, but a section of the portion 40 is cut away to permit communication through the passage 34 to the exhaust port 18. A spring 42 yieldably urges the piston 36 to the left viewing FIG. 1.

A proportional solenoid assembly of the type known to those skilled in the art and generally indicated by the numeral 44 is also mounted within the housing 12. Solenoid assembly 44 includes a coil 46 wound around an armature 48 and a stationary pole piece 50. Armature 48 is slidably mounted in the coil 46, and is connected to the piston 36 by a member 51 so that movement of the armature 48 is transmitted directly to move the piston 36. The pole piece 50 and armature 48 are contoured in a manner well known to those skilled in the art such that the force applied to the piston 36 by the armature 48 is a direct function of the current applied to the coil 46 independently of movement of the armature 48. A manual overriding device 52 is provided to operate the armature 48 to thereby actuate the valve components 22 for system diagnostic and maintenance.

A circumferentially extending diaphragm 54 extends between the piston 36 and the housing 12. The diaphragm 54 not only seals between the piston 36 and the housing 12 but also provides a feedback force opposing movement of the armature 48. One side of the diaphragm 54 is exposed to the pressure level in the delivery port 16, and the opposite side of the diaphragm 54 is vented through atmosphere through the solenoid assembly 44. Accordingly, the diaphragm 54 has a net effective area indicated in the drawing as Area A against which the pressure at delivery port 16 acts. The force opposing movement of the armature 48 will therefore be a function of the pressure level at outlet or delivery port 16 acting against Area A, so that the force required from the solenoid assembly 44 to operate the valve components 22 to increase the pressure level at the delivery port 16 will increase as the pressure level at delivery port 16 increases, thereby requiring increasing current levels in the coil 46 to achieve the required force output to actuate the valve components 22. Accordingly, the pressure level at delivery port 16 will be a function of the current applied to the coil 46.

In operation, the various components of the modulator 10 are illustrated in FIG. 1 in the positions which the assume when no current is applied to the coil 46 and the delivery pressure at delivery port 16 is substantially atmospheric. In this condition, the valve seating area 38 is disengaged from the inlet/exhaust valve 24 so that the delivery port 16 is vented to atmosphere through exhaust port 18 and passage 34. The spring 42 biases the valve seating area 38 in the disengaged position as illustrated. At the same time, the spring 29 biases the inlet/exhaust valve 24 into sealing engagement with the valve seat 28, thereby closing off the supply or inlet port 14. The effective area B of the valve seating area 26 which is responsive to the pressure level at the supply port 14 is substantially the same as the effective area C of the diaphragm 30 which is also exposed to the fluid pressure level at supply or inlet port 14. Since the forces generated by fluid pressure acting against Areas B and C oppose one another, the fluid pressure forces generated by pressure at inlet port 14 acting against the inlet/exhaust valve 24 cancel each other so that the valve is held closed by the force of spring 29. By cancelling the forces due to fluid pressure inlet port 14 so that the valve is held closed by the spring 29, the force required to open the inlet/exhaust valve 24 is made independent of the variations of fluid pressure at supply or inlet port 14. Since the force output of the solenoid assembly 44 can vary only over a relatively limited range, it is usually desirable that the force required to open the inlet/exhaust valve 24 be kept as constant as possible.

When a predetermined fluid pressure level is demanded at delivery port 16, a predetermined current level is transmitted to the coil 46, thereby causing a predetermined force output generated on armature 48. Accordingly, the piston 36 is moved to the right viewing FIG. 1, first closing off valve seating area 38 against valve seating 26 to terminate communication between delivery port 16 and exhaust port 18, and thereinafter cracking open the valve seating area 26 from the valve seating area 28 to permit communication from supply port 14 to delivery port 16, thereby increasing the pressure at delivery port 16. As the pressure at delivery port 16 increases, the force acting across effecting area A of diaphragm 54 will also increase. The increasing pressure at delivery port 16 also acts across the effective area D between the valve seating 38 and the valve seating area 28. Accordingly, the force of spring 42 and the force against effective area A urge the piston 36 to the left viewing FIG. 1; the force of the solenoid and the force acting across effective area D tend to urge the valve components 22 to the right viewing FIG. 1. When these forces balance, the valve components 22 move into the lapped position illustrated in FIG. 3, in which the valve seating area 26 closes off against both the valve seat 28 and the valve seat area 38, so that communication between the delivery port 16 and both the exhaust port 18 and the supply inlet port 14 is terminated. The force balance across the valve components 22 is given by the equation:

$$F_{solenoid} + F_{areaD} - F_{areaA} - F_{spring} = 0$$

The valve components 22 remain in this lapped condition until the force balance given by the above equation is upset. For example, if the operator desires a higher pressure at delivery port 16, the current in solenoid coil 46 is increased, thereby urging the valve components 22 to the right viewing the Figures, to crack open the valve seating area 26 from the valve seating area 28, thereby allowing additional communication between the supplier port 14 to the delivery port 16 to increase the pressure level at the delivery port 16. This increasing pressure level at the delivery port 16 acts across area A, in opposition to the force generated from the solenoid assembly 44. When the forces again balance as given by the above equation, the valve components 22 move back to the lapped condition.

Similarly, if the operator desires to reduce the pressure level at the delivery port 16, the current to the solenoid 46 is decreased, so that the pressure level at delivery port 16 acting across area A of diaphragm 54, because of the reduced solenoid force, is able to move the valve piston 36 to the left viewing the Figures, thereby cracking open the valve seat 38 from the valve seat 26, to thereby let some of the pressure at the delivery port 16 to bleed off to atmosphere through exhaust port 18. When the pressure at delivery port 16 is reduced such that the force balance given by the above equation is reestablished, the seating area 38 recloses against the seating area 26 so that the valve components 22 are returned to the lapped condition illustrated in FIG. 3.

When the operator wants to vent the pressure level at the delivery port 16, the current to coil 46 is turned off, so that the pressure level at delivery port 16 acting across area A returns the piston 36 to the position illustrated in FIG. 1. At the same time, the spring 29 returns the inlet/exhaust valve 24 into engagement with the valve seating area 28, thereby close off the supply or inlet port 14 while the delivery port 16 is vented to the exhaust port 18.

We claim:

1. A proportional modulator for generating a fluid pressure level proportional to an electrical current, comprising a housing having an inlet port communicated to a fluid pressure source, an outlet port, and an exhaust port, valve means for controlling communication between the inlet port, the outlet port, and the exhaust port, a proportional solenoid actuator within said housing comprising an electrical coil and an armature actuated by said coil whereby the force applied to the armature is a direct function of the electrical current applied to said coil, said armature being connected to said valve means for operating the latter for controlling communication between the inlet port, the outlet port, and the exhaust port, said valve means moving to a lapped position when a preselected pressure level is established at said outlet port, said preselected pressure level being a function of the current applied to said coil, and a pair of oppositely acting fluid pressure responsive surfaces acting against said armature, each of said oppositely acting surfaces being exposed to the fluid pressure level at the outlet port, said surfaces applying a net feedback force on said armature which is a predetermined function on the pressure level at the outlet port, one of said oppositely acting surfaces extending between the armature and the housing and exerting a feedback force on said armature opposing the force applied thereto by said coil, said valve means including a valve member slidably mounted in said housing for controlling communication from the inlet port to the outlet port, a spring yieldably urging said valve member toward a position in which the valve member sealingly engages a valve seat carried by the housing, said valve member including a pair of oppositely acting fluid pressure responsive areas each of which is responsive to the pressure level at the inlet port to substantially cancel the forces exerted on the valve member by fluid pressure at the inlet port.

2. Proportional modulator as claimed in claim 1, wherein said valve means includes a valve seat carried by said armature for controlling communication through the exhaust port.

3. Proportional modulator as claimed in claim 2, wherein the valve seat on said armature is movable by the latter toward and away from sealing engagement with a valve seating area on said valve member, the other of said oppositely acting surfaces being defined on said valve member and being effective when the valve means is in the lapped position to at least partially oppose the one oppositely acting surface.

4. Proportional modulator as claimed in claim 3, wherein said valve seats encompass different valve seating sections on said valve seating area, said other of said oppositely acting surfaces is defined on said valve seating area as the difference between the valve seating sections.

5. Proportional modulator as claimed in claim 4, wherein a resilient member between the armature and the valve member yieldably urges the valve seat on the armature away from the valve seating area on the valve member.

6. Proportional modulator as claimed in claim 4, wherein said valve seating sections are concentric.

* * * * *